United States Patent [19]

Greiner

[11] Patent Number: 4,605,198
[45] Date of Patent: Aug. 12, 1986

[54] DAMPER CONSTRUCTION

[75] Inventor: Waldemar H. Greiner, Hamilton, Canada

[73] Assignee: Seal-Air Control Systems Inc., Downsview, Canada

[21] Appl. No.: 701,990

[22] Filed: Feb. 14, 1985

[30] Foreign Application Priority Data

Jan. 28, 1985 [CA] Canada .................................. 473012

[51] Int. Cl.⁴ ............................................ F16K 31/12
[52] U.S. Cl. .......................................... 251/58; 74/25; 74/57; 251/229; 251/251; 251/279; 251/305; 98/41.1
[58] Field of Search ...................... 98/41.1; 74/25, 57; 251/58, 229, 251, 279, 305

[56] References Cited

U.S. PATENT DOCUMENTS

| | | | |
|---|---|---|---|
| 1,534,513 | 4/1925 | Fulton | 251/229 |
| 2,930,245 | 3/1960 | Wiggs | 251/279 |
| 3,696,684 | 10/1972 | Estlick | 251/229 |
| 3,869,925 | 3/1975 | Brems | 74/25 |
| 4,285,499 | 8/1981 | Zukausky | 251/229 |
| 4,533,113 | 8/1985 | Francart, Jr. | 251/279 |

FOREIGN PATENT DOCUMENTS 1143992  4/1983  Canada .................................. 251/229

*Primary Examiner*—G. L. Walton
*Attorney, Agent, or Firm*—Sim & McBurney

[57] ABSTRACT

A damper controls fluid flow and includes a frame with an opening through which the fluid is intended to flow when the damper is open, and a closure cap movable between a first position in which it blocks the opening and a second position in which the opening is unblocked. In the second position, the closure cap is rotated with respect to its first position, so as to minimize interference with fluid flow through the opening. A mechanism controls the movement of the closure cap, and includes a first and second bracket fixed with respect to the frame and the closure cap, respectively. An elongate guideway is defined in one bracket and a pin on the other bracket is captive within the elongate guideway. The brackets include a stabilizing track arrangement spaced from the guideway and the pin, and being such as to require the second bracket to substantially retain a given angular orientation with respect to the first bracket while the pin slides from a first end to a second end of the elongate guideway, thus moving the closure cap in translation with respect to the frame, and to rotate with respect to the first bracket about the second end of the elongate guideway, thus moving the closure cap in rotation with respect to the frame. A cylinder or the like is provided to positively move the brackets with respect to each other.

7 Claims, 9 Drawing Figures

DAMPER CONSTRUCTION

This invention relates generally to dampers, and has to do particularly with an improved damper construction suitable for use in air distribution systems for buildings, although not limited thereto.

BACKGROUND OF THIS INVENTION

In the air distribution system for a typical large modern building, accurate and reliable control of various dampers (air valves) is essential to the proper functioning of the system. Many large buildings are currently constructed as sealed units, having an air distribution system which includes a central source that provides conditioned return air which can be mixed with a percentage of outside air. The mixture is then circulated through the building.

Under certain circumstances, it may be desirable to draw a large quantity of outside air for mixing with conditioned and return air from the building. However, at other times no outside air is needed. Under these conditions, and others within a building, a damper capable of tightly closing off the air passage is desirable.

The prior art contains several approaches to achieving control with a damper of this kind, and Canadian Pat. No. 1,143,992, issued Apr. 5, 1983 to Mitco Corporation, is exemplary.

However the latter patent and others are based on quasi-parallelogram linkages and require members of a substantial size for the necessary rigidity.

GENERAL DESCRIPTION OF THIS INVENTION

By contrast, it is an aim of one aspect of this invention to provide an air damper construction in which the mechanism controlling the damper itself utilizes no linkages of any kind, and instead achieves the desired movement of the damper through a system of rollers, cams or pins following suitably designed tracks or guideways under the influence of a power element such as an air-operated cylinder.

The construction to be disclosed herein is inexpensive, reliable and less cumbersome than the linkage arrangement taught in the prior art.

Accordingly, this invention provides a damper for controlling fluid flow. The damper includes a frame having an opening through which fluid is intended to flow when the damper is open. A closure member is movable between a first position in which it blocks the opening, and a second position in which the opening is unblocked and the closure member is rotated with respect to its first position, so as to minimize its interference with fluid flow through the opening. A mechanism controls the movement of the closure member, the mechanism including:

(a) a first and a second bracket fixed with respect to the frame and the closure member, respectively, (b) an elongate guideway defined by one bracket and registry means defined by the other bracket, the registry means being movably captive within said elongate guideway, (c) stabilizing track means on the brackets spaced from said guideway and registry means, the stabilizing track means requiring the second bracket 1) to substantially retain a given angular orientation with respect to the first bracket while the registry means slides from a first end to a second end of said elongate guideway thus moving said closure member in translation with respect to said frame, and 2) to rotate with respect to said first bracket about said second end of said elongate guideway thus moving said closure member in rotation with respect to said frame; and (d) power means to positively move the brackets with respect to each other.

GENERAL DESCRIPTION OF THE DRAWINGS

Several embodiments of this invention are illustrated in the accompanying drawings, in which like numerals denote like parts throughout the several views, and in which.

DETAILED DESCRIPTION OF THE DRAWINGS

Figure 2:
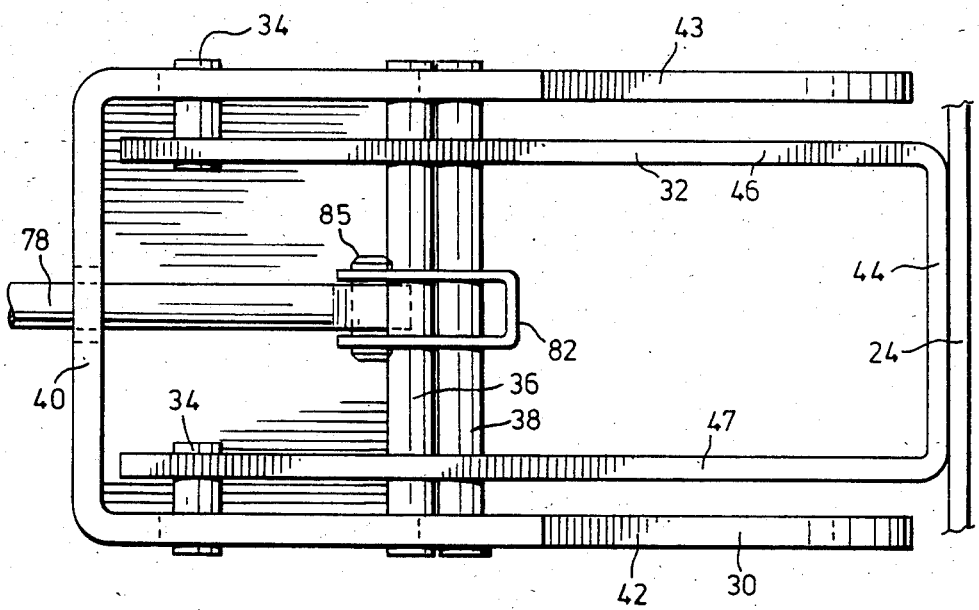
FIG. 2 is a top view of the mechanism shown in FIG. 1.
Figure 3:
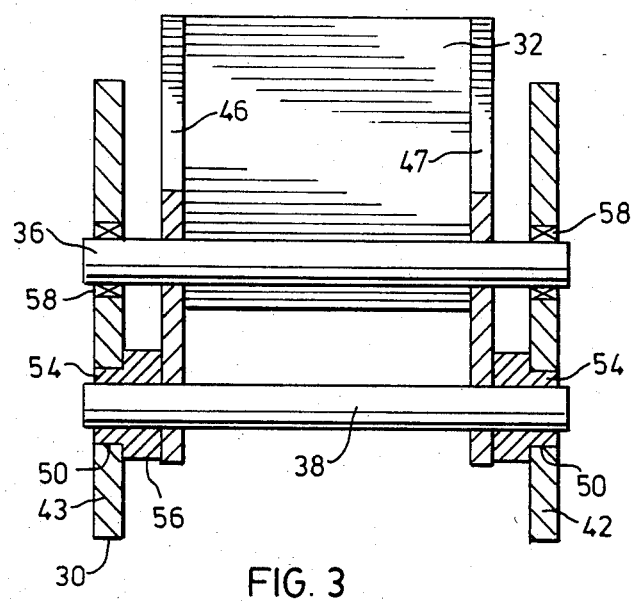
FIG. 3 is a sectional view taken at the line 3—3 of FIG. 1.
Figure 4:
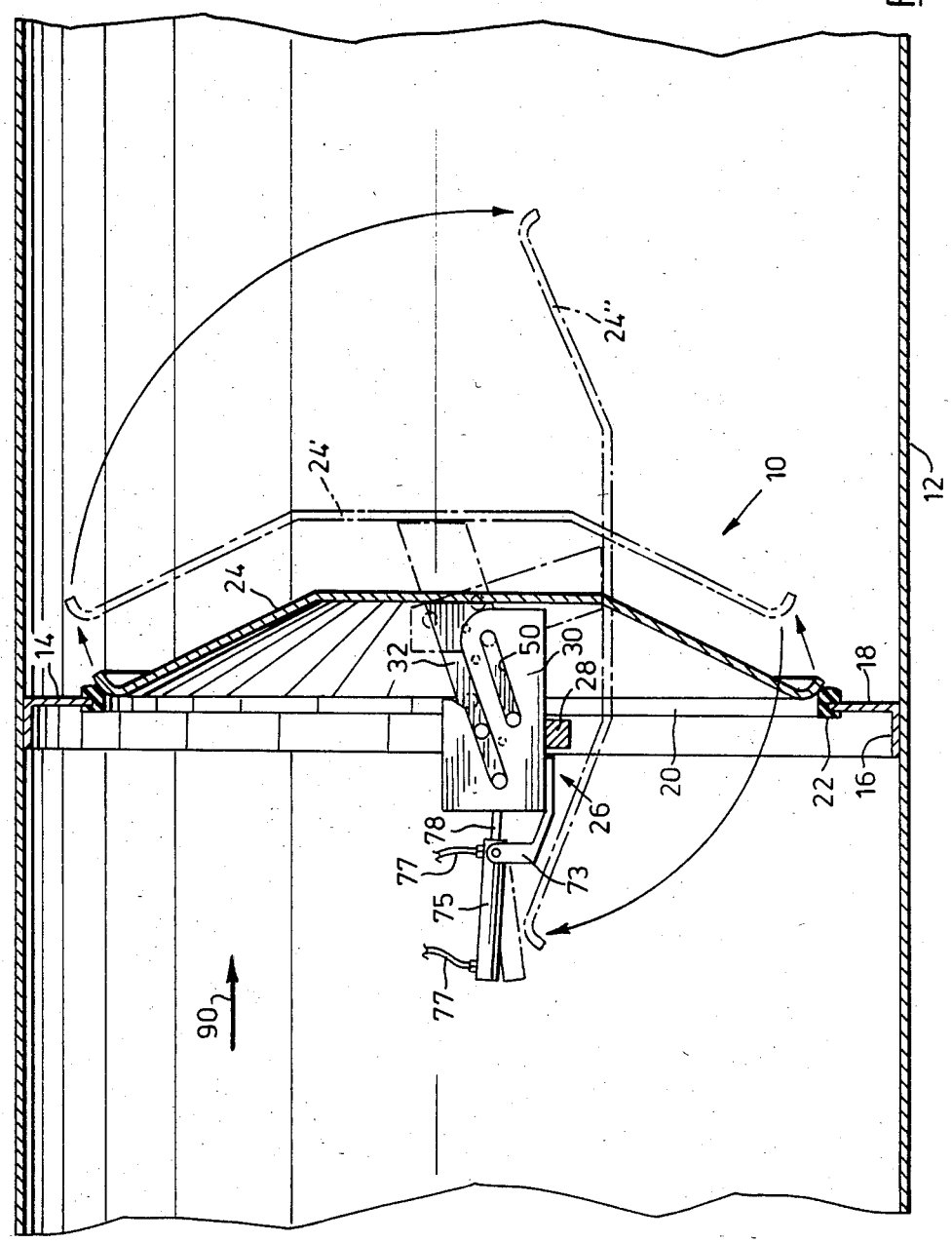
FIG. 4 is a sectional view through an air duct, showing the control mechanism of FIG. 1 in place and the way in which it cooperates with the closure member of the air damper.

Attention is first directed to FIGS. 1–4, which illustrate a damper 10 for controlling the flow of a fluid such as air. In FIG. 4, a duct 12 is illustrated in section, the duct having welded or otherwise affixed thereto an internal frame 14 which in section has an L-shape, including a first arm 16 which is secured to the wall of the duct 12, and a second arm 18 extending inwardly from the wall of the duct 12. The arm 18 is of course continuous around the duct 12, and has a central circular opening 20. Adjacent the rim of the opening 20 there is affixed to the margin of the arm 18 an annular seal 22. A closure member 24 of a somewhat dished configuration is adapted to close tightly against the 0-ring 22 in order to seal the duct 12 against further passage of air, and a mechanism generally designated by the numeral 26 is provided to control movement of the closure member 24. To support the mechanism 26, a square bracket 28 extends across the opening 20 and is welded or otherwise secured at its opposite ends to appropriate portions of the frame 14. To the bracket 28 is secured the mechanism 26, the construction of which will now be more fully described with reference to FIGS. 1, 2 and 3.

The mechanism 26 includes a first bracket 30, a second bracket 32, two pins 36 and 38 which extend laterally through both brackets, and two aligned spigots 34.

The first bracket 30 is U-shaped in section, as can be seen in FIG. 3, and includes an end wall 40 and two side walls 42 and 43. The second bracket 32 is also U-shaped, and has an end wall 44 to the right in FIG. 1, with two walls 46 and 47 extending obliquely leftwardly and downwardly in FIG. 1. These two side walls can be seen in FIG. 3 in section.

Figure 1:
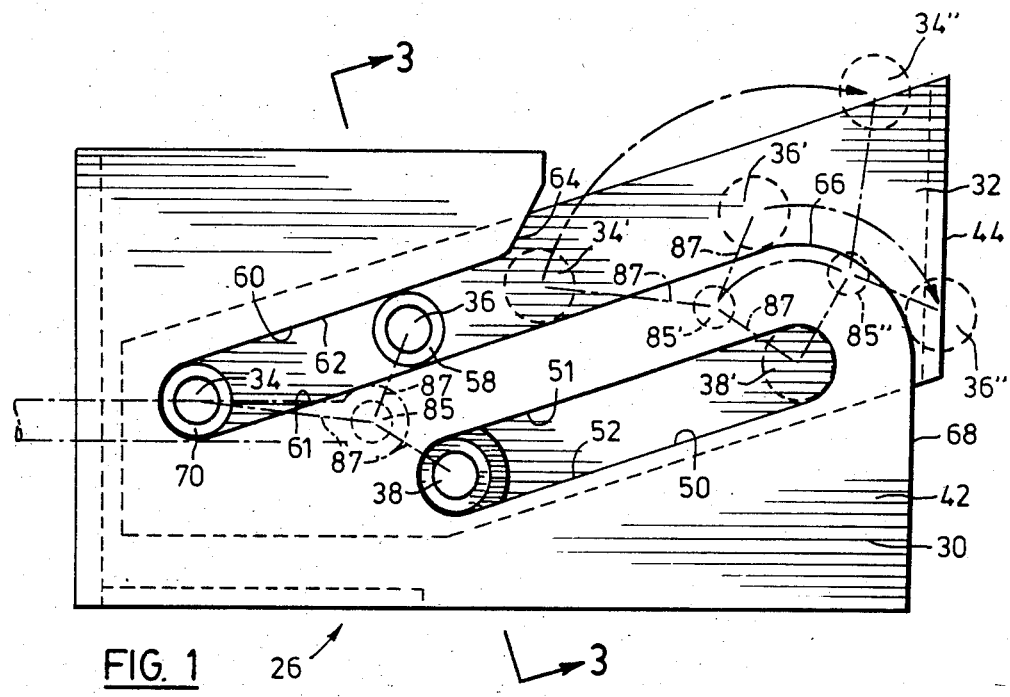
FIG. 1 is an elevational view of a portion of a control mechanism constituting a first embodiment of this invention.

Each of the side walls 42 and 43 of the first bracket 30 contains an elongate guideway 50 which in the embodiment shown is rectilinear. The elongate guideway 50 has two opposed parallel sides 51 and 52 and circularly rounded ends. As can be seen in FIG. 3, the pin 38 has, at each end, a bushing 54 with a shape that allows the pin 38 to slide longitudinally of the elongate guideway 50. Each bushing 54 also includes a flange 56 which is positioned between the adjacent side walls of the two brackets 30 and 32, thus spacing them apart while allowing relative sliding movement between them. Alternatively, the bushings 54 could be dispensed with, and the walls 46 and 47 could slidingly abut the walls 43 and 42, respectively. The pin 36 has at either end a roller bearing 58 which is adapted to slide within a slot 60 having at the left in FIG. 1 two parallel side walls 61 and 62. The slot 60 opens to the right to allow an arcing movement of the pin 36 as will subsequently be explained, but is closed at the left (as seen in FIG. 1) by a rounded end. As can be seen in FIG. 1, the upper edge 62 of the slot 60 undergoes an oblique upward bend at 64, while the lower edge 61 continues to the right and upwardly at a slope, to terminate in a circularly rounded portion 66, the latter terminating in a vertical portion 68. The rounded portion 66 is concentric with the rightward rounded end of the elongate guideway 50.

The pin 34 also has a roller bearing 70, and follows along slot 60, as does the pin 36.

Referring to FIG. 4, it will be seen that a further bracket 73 secured to the bracket 30 supports for pivotal motion the rightward end of an air cylinder 75 having air feedlines 77 and a piston rod 78. As can be seen in FIG. 2, the piston rod 78 is connected through a pin 80 to a clevis 82 having a U-shape and having spaced circular apertures for receiving the pins 36 and 38. The clevis 82 fits on the pins with mechanical interference to secure it in place.

At a location equidistantly spaced from the centers of the pin 36 and 38, and slightly to the left as seen in FIG. 1, the clevis 82 is connected to the piston rod 78 by a short pin 85. This connection allows the piston rod 78 to push rightwardly against the clevis 82, which force is transferred through the pins 36 and 38 to the bracket 32, and thus to the closure member 24.

Attention is now directed to FIG. 1, for a description of the different phases of movement of the second bracket 32 with respect to the first bracket 30 as the piston rod 78 urges the second bracket 32 rightwardly (and slopingly upwardly) with respect to the first bracket 30.

It can be seen that, since the guideway 50 and the slot 60 are parallel and slope upwardly to the right, the second bracket 32 will initially move in translation along a line parallel with the guideway 50. The pins 34, 36 and 38 are shown linked to the pin 85 at the left in FIG. 1 by three broken lines 87. These lines do not represent any mechanical structure, but are inserted for the purpose of clarifying the present discussion. It will be appreciated that the three lines 87 will remain in the same relative orientation at all times, due to the fact that the pins 34, 36 and 38 all pass through openings in the second bracket 32, which locks them into position.

At the end of this translational phase of movement, the pins 34, 36 and 38 are located at the broken circles 34', 36' and 38', respectively, with the pin 85 also being shown at 85'. The broken lines 87 remain in the same relative orientation at the end of this translational phase. In this position, the pin 38 has come to the end of the guideway 50, and now constitutes a pivot point about which the entire second bracket 32 rotates. It will now be understood why the portion 66 of the lower edge 61 of the slot 60 is rounded and concentric with the rightward end of the guideway 50. The pin 36 moves from the position 36' to the position 36", which is a movement of approximately 90°. At the same time, the pin 34 moves from the position 34' to the position 34", and a similar motion is undergone by the pin 85, to the position 85". The positions shown as 34", 36" and 38' represent the furthest extension of the piston rod 78, and therefore pivotal movement of the second bracket 32 is halted at this point.

In order to retract the second bracket 32 back to the position shown in solid lines at the left in FIG. 1, the piston rod is retracted to the left. Because of the geometry just described, the second bracket 32 must now exactly reverse its motion, and pass through a rotational phase back to the positions shown at 34', 36' and 38', following which it can move in translation downwardly and leftwardly to the solid line positions shown at 34, 36 and 38 in FIG. 1.

In FIG. 4, the closure member 24 is shown in broken lines at 24', representing the end of the translational phase of movement of the second bracket 32, and is shown again in broken lines at 24", this representing the end of the rotational phase of movement of the second bracket 32. It will be seen that, in the position 24", the closure member is situated approximately parallel to the flow direction of air (arrow 90) through the duct 12.

The remaining figures shown alternative embodiments for the basic mechanism which is illustrated at 26 in FIGS. 1 and 4.

Figure 5:
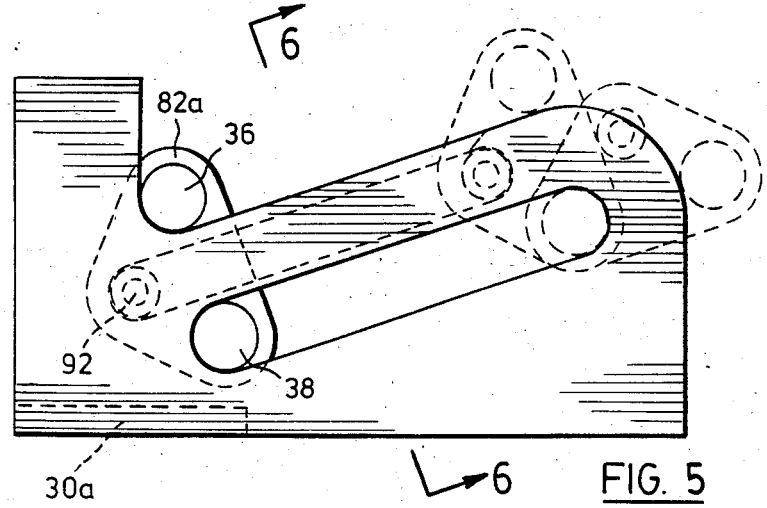
FIG. 5 is a view similar to FIG. 1 and illustrates a second embodiment of this invention.

In FIG. 5, the second bracket has not been shown (for the sake of simplicity), but the clevis 82a is illustrated.

Figure 6:
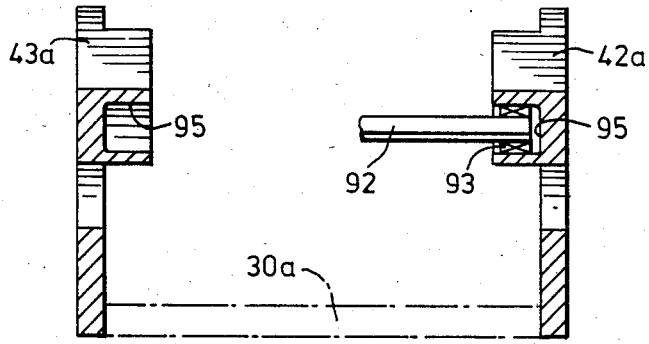
FIG. 6 is a sectional view taken at the line 6—6 in FIG. 5.

Looking at both FIGS. 5 and 6, the construction has been somewhat simplified in this embodiment, in that the rear pin 34 of the FIG. 1 embodiment has been eliminated, and the short pin 85 has been extended to provide an elongate shaft 92 having a roller bearing 93 at either end, the roller bearings 93 tracking within respective guideways 95 defined integrally by the side walls 42a and 43a of the bracket 30a. The pin 38 remains and has the same function as in the first embodiment. The pin 36 also remains, and it can be seen that the pin 36 follows exactly the same motion has already been described with respect to that pin for the FIG. 1 embodiment. Because the shaft 92 and the pin 38 are both constrained in an angulated sense (because their guideways are closer to each other than the center-to-center distance between the pins), a positive control of the movement of the second bracket (not shown in FIGS. 5 and 6) can be attained.

Figure 7:
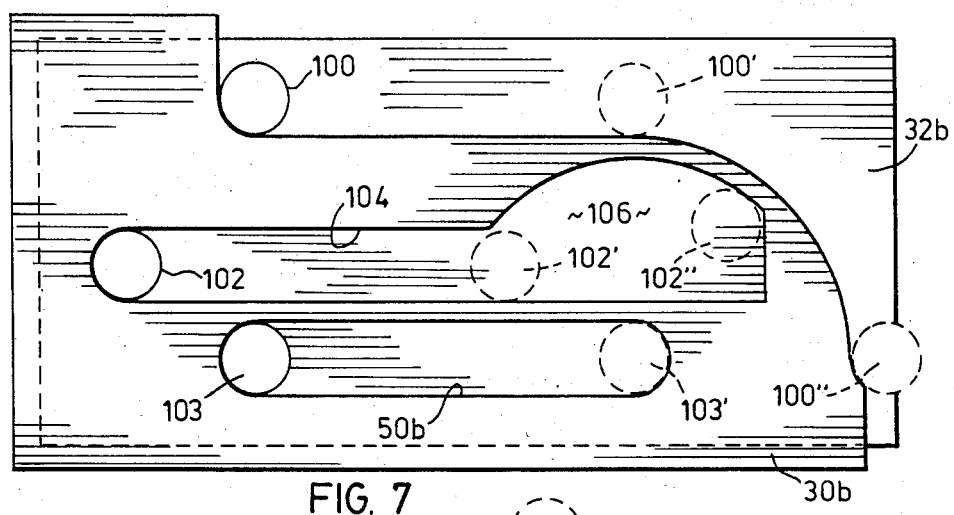
FIG. 7 is a view similar to FIG. 1, but showing a third embodiment of this invention.

FIG. 7 shows a different arrangement of pins 100, 102 and 103, which are understood to be held in the same relative position at all times by the bracket 32b. A bracket 30b provides an elongate guideway 50b and a further elongate guideway 104 having a widened portion 106 at the rightward end to allow arcuate movement of the pin 102 from the position 102' to the position 102".

The connection between the piston rod and the bracket 32b can be accomplished in any number of conventional ways, and need not be described in detail.

From the drawing of FIG. 7, the way in which the mechanism works will be clear.

Figure 8:
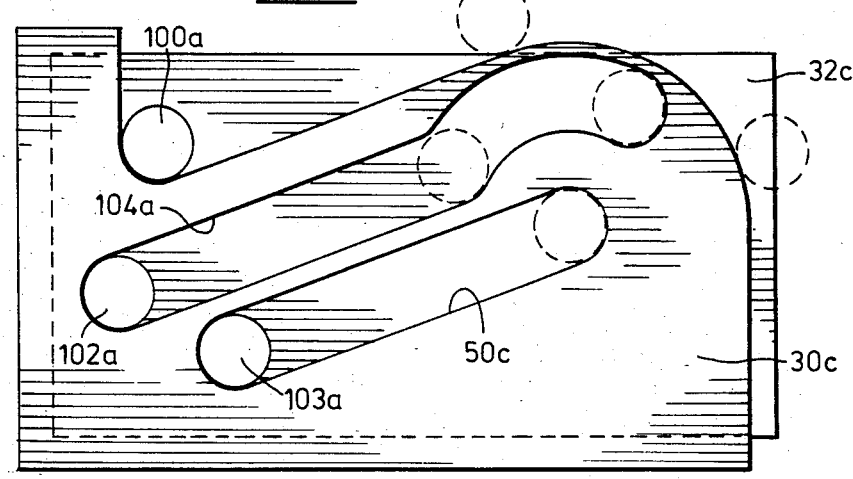
FIG. 8 is a view similar to FIG. 1, showing a fourth embodiment of this invention.

In the embodiment shown in FIG. 8, the construction is similar to that shown in FIG. 7, except that the second bracket 32c moves in translation upwardly to the right rather than horizontally as in FIG. 7. It will be appreciated, from a study of FIG. 4, that it is of advantage to move the closure member 24 initially away from the edge of the opening 20 through which the periphery of the closure member 24 must swing. If that does not happen, then the closure member 24 must be moved further away from the opening in the translational phase of movement, before swinging can start. Thus, the embodiments which show an oblique motion for the translational phase of movement of the closure member 24 allow a shorter stroke of the piston.

Figure 9:
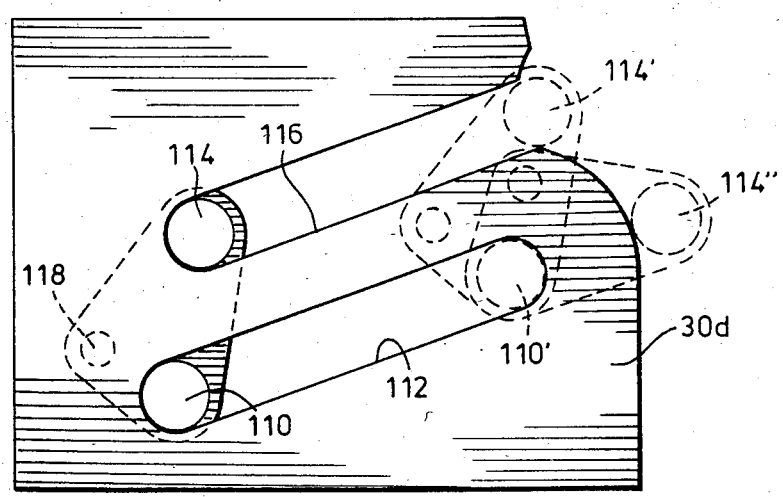
FIG. 9 is a view similar to FIG. 1, showing a fifth embodiment of this invention.

FIG. 9 shows a two-pin arrangement, in which two pins 110 and 114 are positively constrained within the elongate guideways 112 and 116. Because the pins 110 and 114 are offset with respect to the direction of the guideways 112 and 116, they will keep their oblique orientation regardless of the presence of a force on pin 118. After the translational phase, the pins have reached the positions 110' and 114', following which the rotational phase carries the pin 114 around to the position 114''. To retract the bracket and the closure member, a reversal of this motion is required for the second bracket.

While several embodiments of this invention have been illustrated in the appended drawings and described hereinabove, it will be evident to those skilled in the art that changes and modifications may be made therein without departing from the essence of this invention, as set forth in the appended claims.

I claim:

1. A damper for controlling fluid flow, comprising:
    a frame having an opening through which fluid is intended to flow when the damper is open,
    a closure member movable between a first position in which it blocks said opening, and a second position in which the opening is unblocked and the closure member is rotated with respect to its first position, so as to minimize its interference with fluid flow through said opening, and;
    mechanism for controlling movement of said closure member, the mechanism including:
    (a) a first and a second bracket fixed with respect to the frame and the closure member, respectively,
    (b) an elongate guideway defined by one bracket and registry means defined by the other bracket, the registry means being movably captive within said elongate guideway,
    (c) stabilizing track means on the brackets spaced from said guideway and registry means, the stabilizing track means requiring the second bracket (1) to substantially retain a given angular orientation with respect to the first bracket while the registry means slides from a first end to a second end of said elongate guideway thus moving said closure member in translation with respect to said frame, and (2) to rotate with respect to said first bracket about said second end of said elongate guideway thus moving said closure member in rotation with respect to said frame when said second bracket is disposed exteriorly of said first bracket; and
    (d) power means to positively move the brackets with respect to each other.

2. The invention claimed in claim 1, in which said one bracket is said first bracket.

3. The invention claimed in claim 1, in which said stabilizing track means comprises:
    a track defined by said one bracket and having a first portion substantially parallel with the guideway, and
    a follower on said other bracket for following said track, the track having a second portion of circular curvature with its center at said second end of the guideway.

4. The invention claimed in claim 3, in which said track is defined by a free edge of said one bracket.

5. The invention claimed in claim 3, in which said stabilizing track means further comprises:
    a further track defined on said one bracket between said guideway and said first-mentioned track, the other bracket having a further follower for following said further track.

6. The invention claimed in claim 5, in which said power means includes a cylinder and piston mechanism connected between said one bracket and said further follower of the other bracket.

7. The invention claimed in claim 6, in which said one bracket is said first bracket.

* * * * *